(12) United States Patent
Shimooka et al.

(10) Patent No.: US 12,152,648 B2
(45) Date of Patent: Nov. 26, 2024

(54) CUSHIONING RUBBER, REACTION FORCE ADJUSTING METHOD THEREOF, AND PEDESTAL

(71) Applicant: NOK CORPORATION, Tokyo (JP)

(72) Inventors: Hiroyuki Shimooka, Kumamoto (JP); Masaya Otsuka, Kumamoto (JP); Kodai Tsujino, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 451 days.

(21) Appl. No.: 17/420,243

(22) PCT Filed: Jan. 30, 2020

(86) PCT No.: PCT/JP2020/003460
§ 371 (c)(1),
(2) Date: Jul. 1, 2021

(87) PCT Pub. No.: WO2020/166357
PCT Pub. Date: Aug. 20, 2020

(65) Prior Publication Data
US 2022/0082146 A1    Mar. 17, 2022

(30) Foreign Application Priority Data

Feb. 15, 2019 (JP) .................................. 2019-025397
Sep. 11, 2019 (JP) .................................. 2019-165310

(51) Int. Cl.
*F16F 1/376* (2006.01)
*F16F 1/371* (2006.01)
(Continued)

(52) U.S. Cl.
CPC .............. *F16F 1/376* (2013.01); *F16F 1/371* (2013.01); *F16F 1/377* (2013.01); *F16F 3/0876* (2013.01);
(Continued)

(58) Field of Classification Search
CPC .. F16F 1/376; F16F 1/371; F16F 1/377; F16F 3/0876; F16F 15/08; F16F 2226/04; F16F 2230/02; F16F 2230/36; F16F 11/22
(Continued)

(56) References Cited

U.S. PATENT DOCUMENTS 2,275,575 A    3/1942    Vrooman
2,874,826 A *  2/1959    Matthews .............. B65D 81/03
                                                         297/DIG. 8
(Continued)

FOREIGN PATENT DOCUMENTS

CN    108819089    11/2018
DE       846158     8/1952
(Continued)

OTHER PUBLICATIONS

China Official Action received in CN Application No. 202080007375. 4, dated May 18, 2022.
(Continued)

*Primary Examiner* — Christopher Garft
*Assistant Examiner* — Michael McDuffie
(74) *Attorney, Agent, or Firm* — GREENBLUM & BERNSTEIN, P.L.C.

(57) ABSTRACT

A sheet-shaped cushioning rubber including a planar base portion and a three-dimensional portion formed to rise from the base portion toward one side in a sheet thickness direction, the planar base portion and the three-dimensional portion being alternately provided in one direction of a sheet plane, wherein the three-dimensional portion includes a hollow portion that opens toward the other side in the sheet thickness direction. The three-dimensional portion is integrally provided with a first rising surface that is continuous from the base portion, a top surface, a second rising surface on a side opposite to the first rising surface, and a pair of
(Continued)

rising surfaces on both sides in a sheet width direction, and the hollow portion opens only toward the other side in the sheet thickness direction.

4 Claims, 23 Drawing Sheets

(51) Int. Cl.
    *F16F 1/377*                (2006.01)
    *F16F 3/087*                (2006.01)
    *F16F 15/08*                (2006.01)
    *F16M 11/22*               (2006.01)

(52) U.S. Cl.
    CPC .......... *F16F 15/08* (2013.01); *F16F 2226/04* (2013.01); *F16F 2230/02* (2013.01); *F16F 2230/36* (2013.01); *F16M 11/22* (2013.01)

(58) Field of Classification Search
    USPC ...... 248/634, 346.01, 346.4, 346.03, 346.04, 248/346.3, 346.02; 108/57.25, 57.17, 108/57.18, 57.19, 51.11, 55.1, 55.3, 57.12
    See application file for complete search history.

(56) References Cited

U.S. PATENT DOCUMENTS

| | | | |
|---|---|---|---|
| 3,142,599 A | 7/1964 | Chavannes | |
| 3,720,176 A * | 3/1973 | Munroe | B65D 19/0051 108/57.25 |
| 3,727,870 A * | 4/1973 | Bass | A47G 29/00 428/116 |
| 4,116,344 A * | 9/1978 | Ziemba | B65G 7/02 248/346.02 |
| 5,195,679 A | 3/1993 | Leeves et al. | |
| 5,425,521 A * | 6/1995 | Locke | B65D 11/16 248/346.02 |
| 5,551,673 A | 9/1996 | Furusawa et al. | |
| 5,636,866 A | 6/1997 | Suzuki et al. | |
| 5,894,045 A * | 4/1999 | Desrondiers | B32B 3/12 52/793.1 |
| 6,018,927 A * | 2/2000 | Major | B32B 3/28 248/346.02 |
| 6,443,513 B1 | 9/2002 | Glance | |
| 6,745,703 B2 * | 6/2004 | Torrey | B65D 19/0012 108/51.11 |
| 7,624,689 B2 * | 12/2009 | Shuert | B65D 19/0036 108/57.25 |
| 8,132,771 B2 * | 3/2012 | Lee | B61D 45/00 211/49.1 |
| 8,136,782 B2 * | 3/2012 | Rowland | F16M 11/22 248/910 |
| 8,465,087 B2 * | 6/2013 | Gerwolls | F16F 7/12 296/146.7 |
| 8,468,955 B2 * | 6/2013 | Durco | B65D 19/36 108/57.17 |
| 8,701,571 B2 * | 4/2014 | Grant | B65D 19/0018 108/57.25 |
| 9,249,853 B2 * | 2/2016 | Cormier | B60R 13/0815 |
| 9,395,034 B1 * | 7/2016 | Rowland | F24F 1/60 |
| 10,343,501 B2 * | 7/2019 | Sawa | B60J 5/0444 |
| 11,655,648 B2 * | 5/2023 | Rausell | B66F 7/28 248/346.01 |
| 11,655,872 B2 * | 5/2023 | Elseser | B29C 45/34 267/140 |
| 2002/0070584 A1 | 6/2002 | Carroll, III et al. | |
| 2010/0102189 A1 * | 4/2010 | Pavone | G06F 1/203 248/346.03 |
| 2010/0244469 A1 | 9/2010 | Gerwolls et al. | |
| 2010/0253114 A1 | 10/2010 | Ohmya et al. | |
| 2011/0296594 A1 | 12/2011 | Thomas et al. | |
| 2013/0136573 A1 * | 5/2013 | Berry | B65D 19/38 414/800 |
| 2013/0160464 A1 * | 6/2013 | Maszczk | B60R 16/0215 248/634 |
| 2015/0059624 A1 * | 3/2015 | Kuo | B65D 19/0042 108/57.25 |
| 2015/0167768 A1 | 6/2015 | Zhao | |
| 2017/0008249 A1 | 1/2017 | Parsons et al. | |
| 2018/0098639 A1 * | 4/2018 | Dahl | A47C 27/065 |
| 2019/0003549 A1 | 1/2019 | Dahl et al. | |

FOREIGN PATENT DOCUMENTS

| | | |
|---|---|---|
| GB | 608622 | 9/1948 |
| GB | 1379652 | 1/1975 |
| JP | 56-131849 | 10/1981 |
| JP | 5-321966 | 12/1993 |
| JP | H9-267597 A | 10/1997 |
| JP | 2008-87669 A | 4/2008 |
| JP | 2010-192207 A | 9/2010 |
| JP | 2011-12807 A | 1/2011 |
| JP | 2018-73545 A | 5/2018 |
| KR | 10-0792266 | 1/2008 |
| WO | 2016/174431 | 11/2016 |

OTHER PUBLICATIONS

ISR for PCT/JP2020/003460, dated Apr. 7, 2020.
Extended European Search Report received in EP Application No. 20755788.5, dated Nov. 14, 2022.
Korea Office Action issued in Application No. 10-2021-7029541, dated Jun. 19, 2023.

* cited by examiner

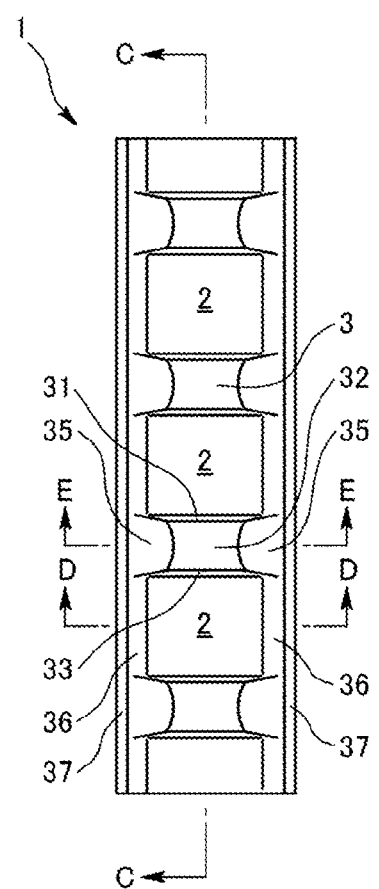 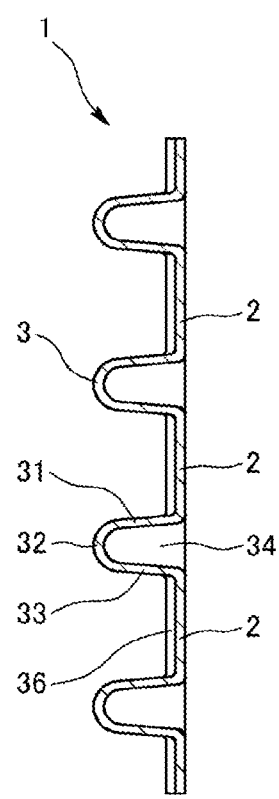
*Fig.4A*  *Fig.4B*

CUSHIONING RUBBER, REACTION FORCE ADJUSTING METHOD THEREOF, AND PEDESTAL

TECHNICAL FIELD

The present disclosure relates to a cushioning rubber, a method of adjusting a magnitude of a reaction force generated in the cushioning rubber, and a pedestal including the cushioning rubber.

BACKGROUND ART

FIG. 16 illustrates an item 52 loaded on a base 51. In such a situation, a sheet-shaped cushioning rubber 53 may be laid on the base 51, and then the loaded item 52 may be stacked thereon. The cushioning rubber 53 has a function of heat transfer, heat insulation, or the like, and as its name implies, exhibits a function of a cushion. The cushioning rubber 53 between the loaded item 52 and the base 51 prevents propagation of vibration from the base 51 to the loaded item 52 or from the loaded item 52 to the base 51.

CITATION LIST

Patent Literature

[PTL 1]
Japanese Patent Application Laid-Open No. 2010-192207
[PTL 2]
Japanese Patent Application Laid-Open No. 2018-73545

SUMMARY OF INVENTION

Technical Problem

The cushioning rubber 53 is formed of a flat rubber having a predetermined thickness as illustrated.

When a cushioning rubber 53 is made of a flat rubber having a predetermined thickness in this way, the following issues can be pointed out.

Rubber is used as a cushion because it generates a reaction force when it is compressed and behaves like a spring. The reaction force tends to increase as an amount of compression increases. A slope of a graph line corresponding to a correlation thereof depends on rubber hardness.

In a case in which a compression margin is to be set larger, the reaction force can be larger, and thus a component having strength to withstand the reaction force is used as a counterpart component receiving the reaction force.

If a component with poor strength such as a sheet metal is used as the counterpart component, it is difficult to set a large compression margin. Therefore, it is difficult to use a cushioning rubber having a low reaction force characteristic in order for receiving a large displacement of a counterpart component.

An object of the present disclosure is to provide a cushioning rubber having a low reaction force characteristic in which a large compression margin can be set.

Solution to Problem

A cushioning rubber of the present disclosure is a sheet-shaped cushioning rubber comprising a planar base portion and a three-dimensional portion formed to rise from the base portion toward one side in a sheet thickness direction, the planar base portion and the three-dimensional portion being alternately provided in one direction of a sheet plane, wherein the three-dimensional portion includes a hollow portion which opens toward another side in the sheet thickness direction.

A reaction force adjusting method of a cushioning rubber of the present disclosure is a method of adjusting a magnitude of a reaction force generated in a cushioning rubber, the method including adjusting the magnitude of the reaction force generated in the cushioning rubber by selecting, when the cushioning rubber is manufactured, any of: forming each of a pair of side rising surfaces at a right angle with respect to the base portion and providing a right-angled corner between each of the side rising surfaces and a top surface; forming each of the side rising surfaces at a right angle with respect to the base portion and providing a rounded portion having an arc-shaped cross-section between each of the side rising surfaces and the top surface; and forming each of the side rising surfaces obliquely with a predetermined inclination angle with respect to an imaginary plane perpendicular surface to the base portion. The cushioning rubber is a sheet-shaped cushioning rubber including a planar base portion and a three-dimensional portion formed to rise from the base portion toward one side in a sheet thickness direction, the planar base portion and the three-dimensional portion being alternately provided in one direction of a sheet plane, wherein the three-dimensional portion includes a hollow portion which opens toward another side in the sheet thickness direction. Further, in the cushioning rubber, the three-dimensional portion is integrally provided with a first rising surface continuous from the base portion, a top surface, a second rising surface on a side opposite to the first rising surface, and a pair of side rising surfaces on both sides in a sheet width direction, and the hollow portion opens only toward the other side in the sheet thickness direction.

Further, another cushioning rubber of the present disclosure is a cushioning rubber including a flat plate portion and a plurality of protruding portions that protrude from the flat plate portion, wherein a periphery of each of the plurality of protruding portions is surrounded by a portion of the flat plate portion, an inside of each of the plurality of protruding portions is configured to be a cavity, and an exhaust passage is provided to allow air inside the cavity of each of the plurality of protruding portions to be exhausted to an outside.

Further, a pedestal of the present disclosure is a pedestal including a base plate and at least one cushioning rubber disposed in a state of being positioned on the base plate, the cushioning rubber including a flat plate portion and a plurality of protruding portions which protrude from the flat plate portion, wherein a periphery of each of the plurality of protruding portions is surrounded by a portion of the flat plate portion, an inside of each of the plurality of protruding portions is configured to be a cavity, and at least one of the base plate and the cushioning rubber is provided with an exhaust passage which allows air inside the cavity of each of the plurality of protruding portions to be exhausted to an outside.

According to these disclosures, when an item to be loaded is loaded and thus the protruding portion is compressed, the air in the cavity inside the protruding portion is exhausted through the exhaust passage. Thus, an increase in an internal pressure in the protruding portion is suppressed, and a repulsive force of the protruding portion against the loaded item does not undergo a change due to the internal pressure in the protruding portion. This stabilizes the repulsive force of the protruding portion against the loaded item.

The exhaust passage may be configured of a plurality of grooves which are formed on a surface of the flat plate portion on a side opposite to a side on which the plurality of protruding portions protrude, so as to extend from an inside of the cavity to a side surface of the flat plate portion.

This secures the exhaust passage even when an adhesive tape is attached to the surface on the side opposite to the side on which the plurality of protruding portions of the flat plate portion of the cushioning rubber protrude in order to fix the cushioning rubber to the base plate.

Further, the exhaust passage may be configured of a groove formed in the base plate.

Further, the configurations described above can be combined where doing so does not result in a contradiction.

Advantageous Effects of Invention

The cushioning rubber according to the present disclosure can exhibit a low reaction force characteristic even when a large crushing margin is set because the three-dimensional portion having the hollow portion is provided alternately with the base portion. Further, a magnitude of the reaction force generated in the cushioning rubber can be adjusted by selecting and changing a shape of the side rising surface.

BRIEF DESCRIPTION OF DRAWINGS

FIG. 3A is an overall perspective view of the cushioning rubber as seen obliquely from above, and FIG. 3B is an overall perspective view of the cushioning rubber as seen obliquely from below.

FIG. 4A is a plan view of the cushioning rubber, and FIG. 4B is a cross-sectional view of the cushioning rubber along line C-C in FIG. 4A.

FIG. 9A is a plan view thereof, and FIG. 9B is a cross-sectional view thereof along line G-G in FIG. 9A.

FIG. 11A is a plan view thereof, FIG. 11B is a cross-sectional view thereof along line H-H in FIG. 11A, and FIG. 11C is a cross-sectional view thereof along the line I-I in FIG. 11A.

FIG. 13A is a plan view thereof, FIG. 13B is a side view thereof, FIG. 13C is a partially enlarged side view of the same of section J in FIG. 13B, and FIG. 13D is a partially enlarged side view of the same of section K in FIG. 13B.

DESCRIPTION OF EMBODIMENTS

Modes for carrying out the present disclosure will be illustratively described in detail below on the basis of embodiments, examples, and the like with reference to the drawings. However, dimensions, materials, shapes, relative arrangements, and the like of components described in the present embodiment are not intended to limit the scope of the present disclosure unless otherwise specified. A pedestal including a cushioning rubber according to the present embodiment described below can be suitably used for loading an item such as a secondary battery to be loaded on a vehicle body. However, an item to be loaded is not limited to the secondary battery, and the pedestal according to the present embodiment can be used for loading an item other than that is to be loaded on the vehicle body. In particular, the pedestal according to the present embodiment can be used in a place in which a shock is generated due to vibration or the like.

First Embodiment

Figure 1:
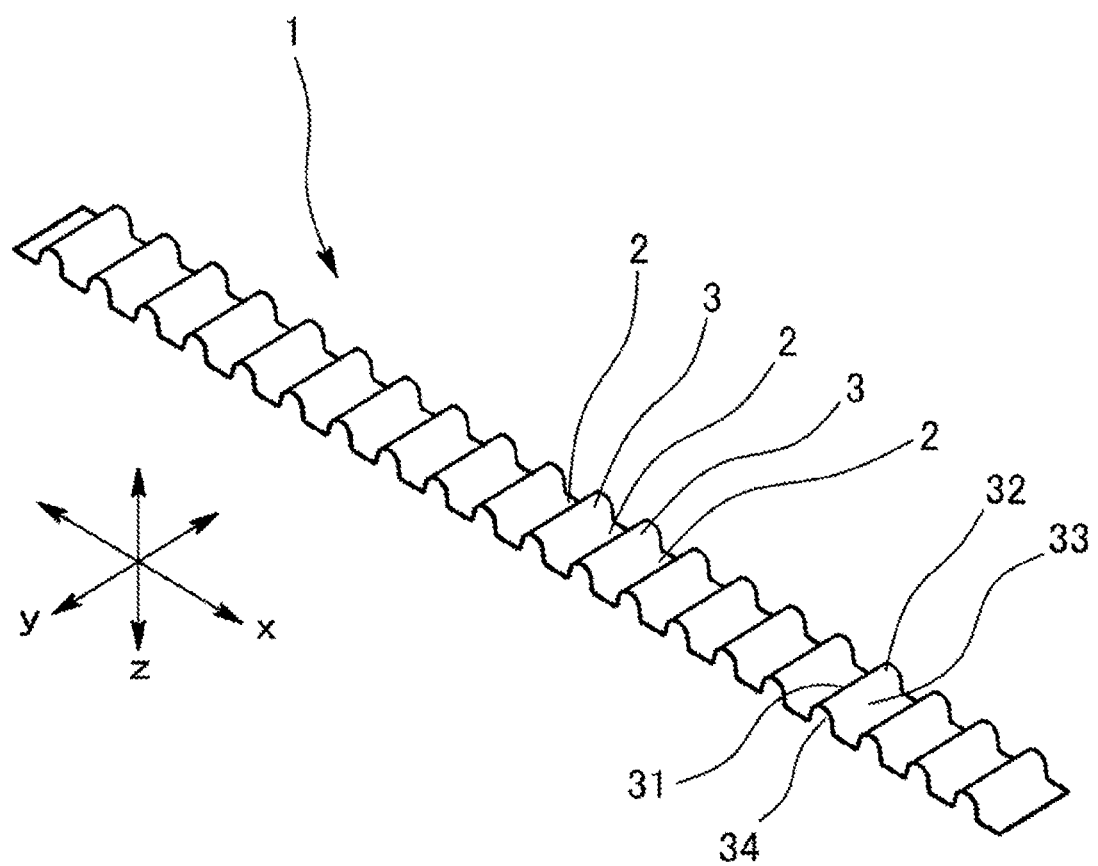
FIG. 1 is an overall perspective view of a cushioning rubber according to a first embodiment.

As shown in FIG. 1, a cushioning rubber 1 is formed as a rubber molded product having a planar rectangular sheet shape as a whole, and exhibits a cushioning action against an input load acting in a sheet thickness direction (the z direction in FIG. 1). The planar shape and the planar size of the illustrated cushioning rubber 1 is an example thereof because these are determined based on a shape and a size of an item to be loaded.

Figure 2A:
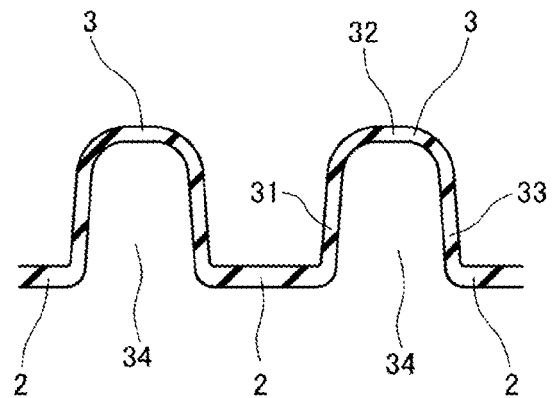
FIG. 2A is a partially enlarged cross-sectional view of the cushioning rubber.

As shown in FIG. 2A, the cushioning rubber 1 has planar base portions 2 and three-dimensional portions 3 formed to rise from end portions of the base portions 2 toward one side (upward in the figure) in the sheet thickness direction, which are alternately and repeatedly provided in a sheet length direction that is one direction on a sheet plane (a horizontal direction in the figure, and x direction in FIG. 1).

The base portion 2 is formed in a flat plate shape.

The three-dimensional portion 3 is formed in a shape integrally provided with one rising surface 31 (first rising surface), which is continuous from the end portion of the base portion 2, a top surface 32, and a rising surface 33 (second rising surface) on a side opposite to the rising surface 31, and a hollow portion 34 that opens toward the other side (downward in the figure) in the sheet thickness direction is provided therein. The pair of rising surfaces 31 and 33 including one rising surface 31 and the opposite rising surface 33 are formed in an inclined surface shape (a taper shape) such that the pair of rising surfaces 31 and 33 come close to each other toward the one side (upward in FIG. 2A) in the sheet thickness direction.

The base portion 2 and the three-dimensional portion 3 are provided entirely in a sheet width direction (a direction perpendicular to the paper plane in the figure, and y direction in FIG. 1), that is, they are provided over the entire width.

Further, the base portion 2 and the three-dimensional portion 3 are each provided to have a constant cross-sectional shape entirely in the sheet width direction (over entire width). Thus, the hollow portion 34 not only opens toward the other side in the sheet thickness direction, but also opens toward both sides in the sheet width direction.

Figure 2B:
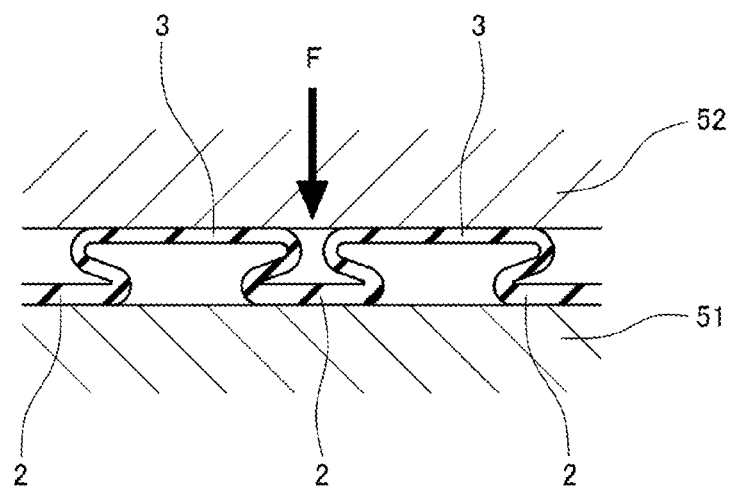
FIG. 2B is a partially enlarged cross-sectional view showing a state in which a load acts on the cushioning rubber.

When the cushioning rubber 1 is laid on a base 51 and an item 52 to be loaded is loaded on the cushioning rubber 1, the cushioning rubber 1 is compressed in the sheet thickness direction as shown in FIG. 2B due to an input load F resulting from a weight, vibration, or the like of the loaded item 52, and elastically deforms to reduce its height.

Second Embodiment

Figure 3A:
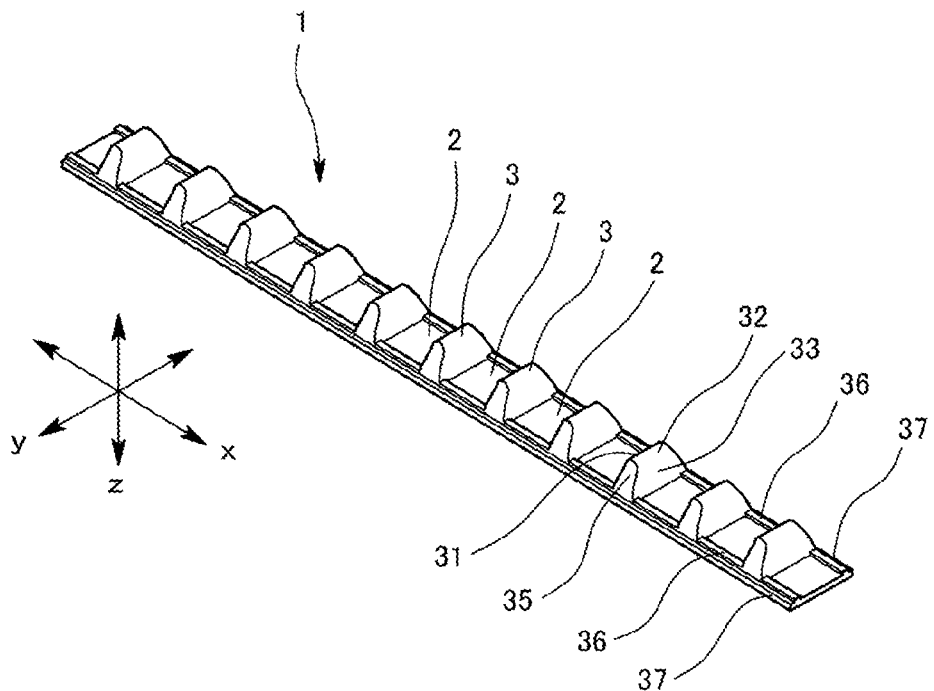
FIGS. 3A and 3B are diagrams showing a cushioning rubber according to a second embodiment.
Figure 3B:
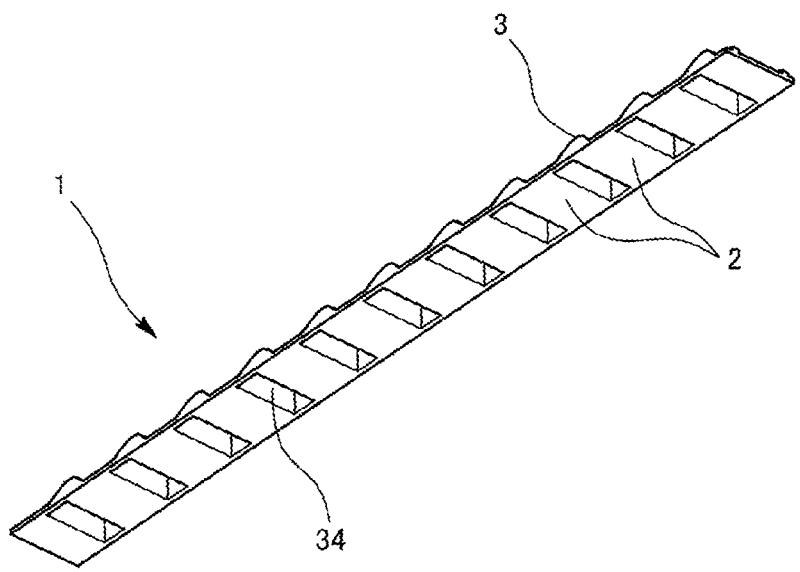

As shown in FIGS. 3A and 3B, the cushioning rubber 1 is formed as a rubber molded product having a planar rectangular sheet shape as a whole, and exhibits a cushioning action against an input load acting in the sheet thickness direction (z direction in FIG. 3A). The planar shape and the planar size of the illustrated cushioning rubber 1 is an example thereof because these are determined based on a shape and a size of an item to be loaded.

Figure 5A:
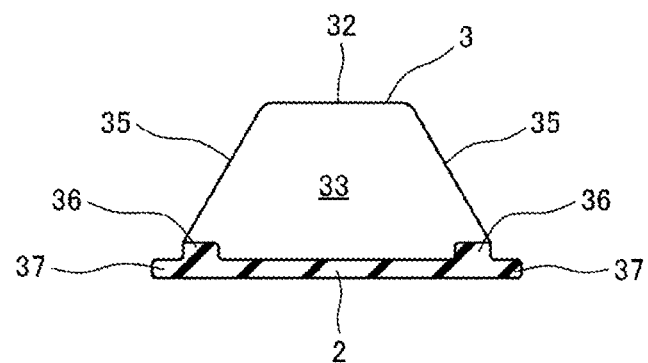
FIG. 5A is an enlarged cross-sectional view of the cushioning rubber along line D-D in FIG. 4A.
Figure 5B:
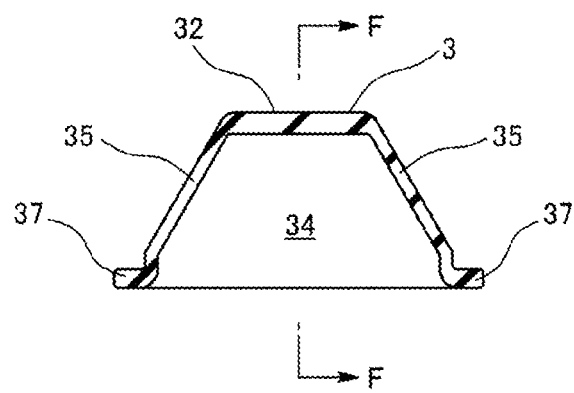
FIG. 5B is an enlarged cross-sectional view of the cushioning rubber along line E-E in FIG. 4A.
Figure 5C:
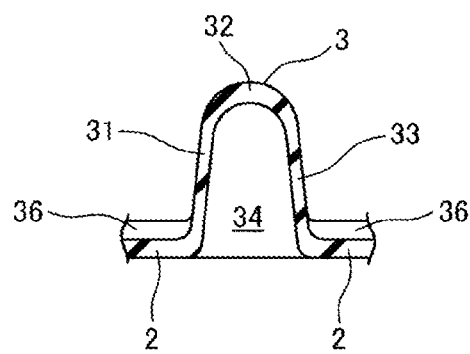
FIG. 5C is a partial cross-sectional view of the cushioning rubber along line F-F in FIG. 5B.

As shown in FIGS. 4 and 5, the cushioning rubber 1 has planar base portions 2 and three-dimensional portions 3 formed to rise from end portions of the base portions 2 toward one side (leftward in FIG. 4B) in the sheet thickness direction, which are alternately and repeatedly provided in a sheet length direction that is one direction of a sheet plane (a vertical direction in FIG. 4B and x direction in FIG. 3A).

The base portion 2 is formed in a flat plate shape.

The three-dimensional portion 3 is formed in a shape integrally provided with one rising surface 31 (first rising surface), which is continuous from the end portion of the base portion 2, a top surface 32, a rising surface 33 (second rising surface) on a side opposite to the rising surface 31, and side rising surfaces (side walls) 35 on both sides in the sheet width direction (y direction in FIG. 3A), and a hollow portion 34 that opens toward the other side (rightward in FIG. 4B) in the sheet thickness direction is provided therein. Thus, the hollow portion 34 does not open toward both sides in the sheet width direction, but opens only toward the other side in the sheet thickness direction because the hollow portion 34 is closed on both sides in the sheet width direction by the side rising surfaces 35. The pair of rising surfaces 31 and 33 including one rising surface 31 and the opposite rising surface 33 are formed in an inclined surface shape (a taper shape) such that the pair of rising surfaces 31 and 33 come close to each other toward one side (leftward in FIG. 4B) in the sheet thickness direction.

As shown in FIG. 5B, the pair of side rising surfaces 35 provided on both sides in the sheet width direction are formed in an inclined surface shape (taper shape) such that the pair of side rising surfaces 35 come close to each other toward one side (upward in FIG. 5B) in the sheet thickness direction. Thus, the three-dimensional portion 3 has a trapezoidal shape when viewed in a direction of FIG. 5B or 5A.

Reinforcing ribs 36 that are connected to the three-dimensional portions 3 and inhibit falling over of the three-dimensional portions 3 are integrally provided on the plane of the base portion 2.

Figure 6A:
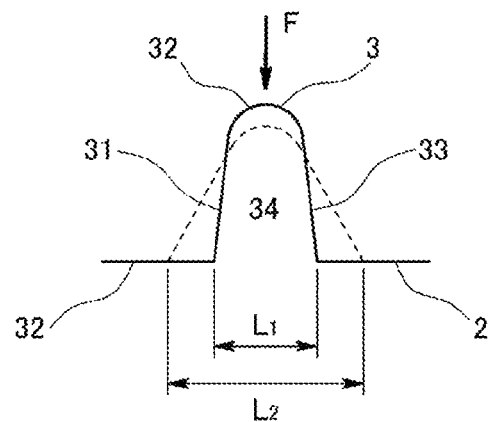
FIGS. 6A and 6B are both explanatory diagrams showing a deformed state of a three-dimensional portion.

When a load such as a weight, vibration, or the like of the loaded item 52 is input from above, the three-dimensional portion 3 is compressed in the sheet thickness direction as shown in FIG. 2B, and only a middle portion thereof is to elastically deform to expand toward both sides in the sheet length direction. On the other hand, when the three-dimensional portion 3 is deformed to fall over toward one side in the sheet length direction, or a root portion of the three-dimensional portion 3 is deformed to spread toward both sides in the sheet length direction, that is, as shown in FIG. 6A, deformed such that a length of the root portion of the three-dimensional portion 3 increases from $L_1$ to $L_2$, desired reaction force may not be generated. In view of this, the reinforcing ribs 36 are provided to support the three-dimensional portion 3 from the sheet length direction, thereby inhibiting the three-dimensional portion 3 from being deformed to fall over toward one side in the sheet length direction or the root portion of the three-dimensional portion 3 from being deformed to spread toward both sides in the sheet length direction.

The reinforcing ribs 36 are disposed between a pair of three-dimensional portions 3 adjacent to each other, extend in the sheet length direction, and are connected to one three-dimensional portion 3 at one ends thereof and to the other three-dimensional portion 3 at the other ends.

Figure 6B:
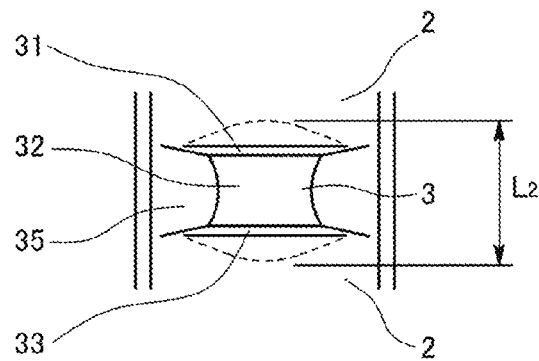
Figure 7A:
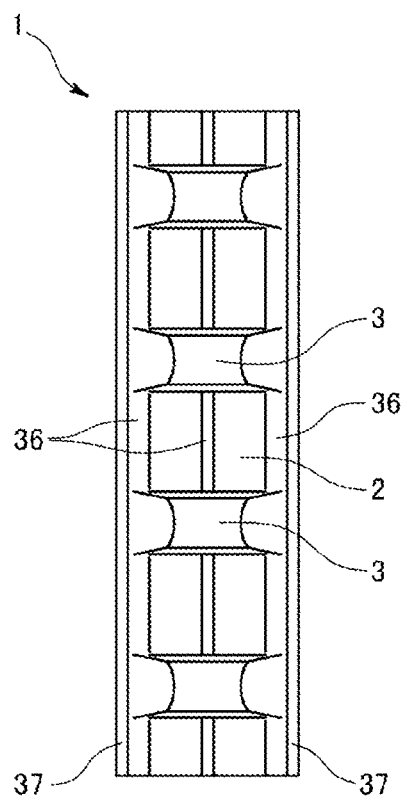
FIGS. 7A and 7B are both plan views showing another example of arrangement of reinforcing ribs.
Figure 7B:
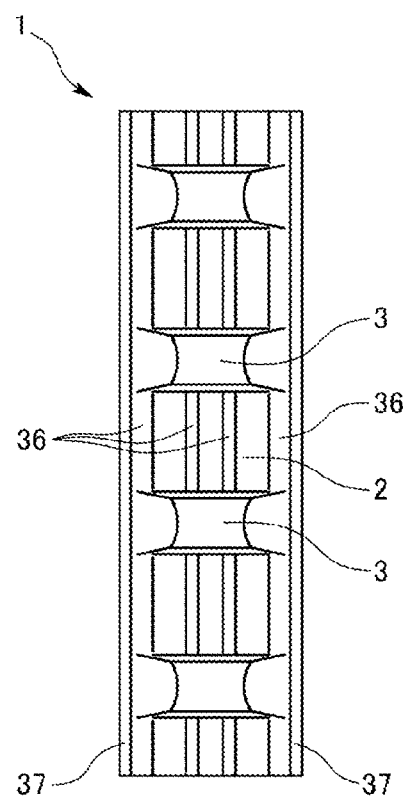

The reinforcing ribs 36 are provided at end portions of the base portion 2 in a width direction thereof. However, the positions where are provided are not limited and may be provided at a central portion of the base portion 2 in the width direction. In FIG. 7A, the reinforcing ribs 36 are provided at both ends of the base portion 2 in the width direction, and additionally one reinforcing rib 36 is further provided at the center in the width direction. In FIG. 7B, the reinforcing ribs 36 are provided at both ends of the base portion 2 in the width direction, and two reinforcing ribs 36 are further provided at the central portion of the base portion 2 in the width direction. In a case in which the reinforcing ribs 36 are provided at the central portion of the base portion 2 in the width direction, as shown in FIG. 6B, it is possible to prevent the three-dimensional portion 3 from being deformed to increase the length $L_2$ of the root portion thereof at the central portion of the base portion 2 in the width direction.

In this example, the reinforcing ribs 36 are provided at both end portions of the base portion 2 in the width direction, that is, two reinforcing ribs 36 are provided. However, the number of the reinforcing ribs provided is not limited. For example, in FIG. 7A, three reinforcing ribs 36 are provided, one at each end portion of the base portion 2 in the width direction, and one at the center in the width direction. In FIG. 7B, four reinforcing ribs 36 are provided, one at each end portion of the base portion 2 in the width direction, and two at the central portion of the base portion 2 in the width direction.

Mounting margin protrusions 37 used as a mounting margin for the cushioning rubber 1 are integrally provided at end portions of the cushioning rubber 1 in the width direction as a whole from the end portions of the cushioning rubber 1 in the width direction toward a direction in which the width of the cushioning rubber 1 increases.

The mounting margin protrusions 37 are provided on both end portions of the cushioning rubber 1 in the width direction.

The mounting margin protrusions 37 are used as engagement parts for positioning the cushioning rubber 1 with respect to a frame body and for preventing the cushioning rubber 1 from coming off when it is mounted on the frame body. The mounting margin protrusions 37 may be combined with the frame body in the following manners.

First Example

Figure 8:
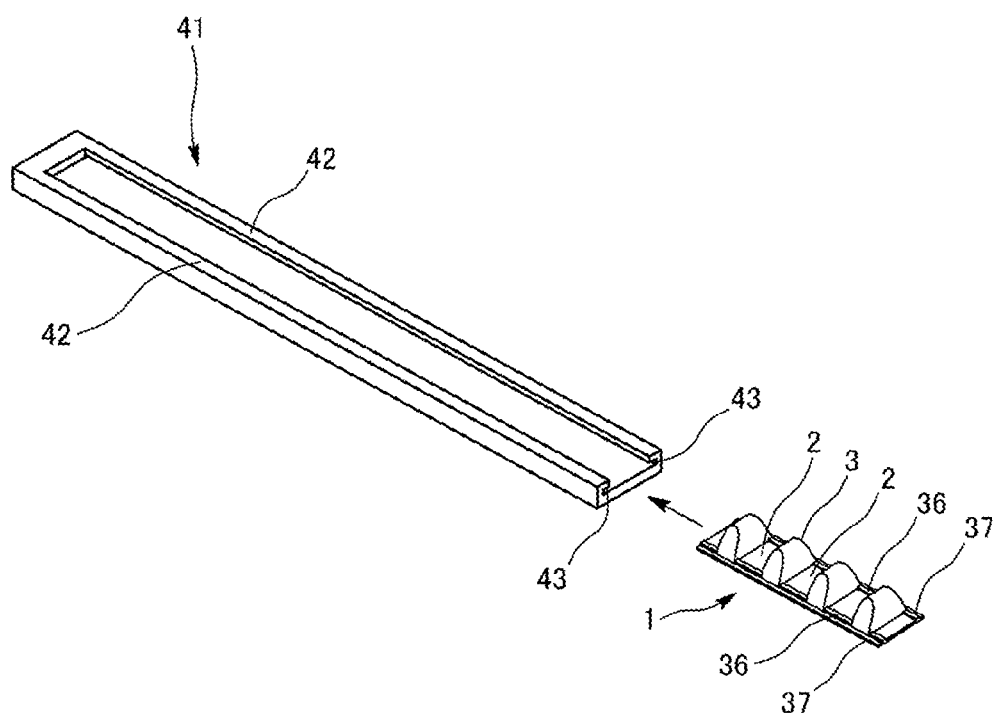
FIG. 8 is a perspective view showing a first example of a mounting structure for the cushioning rubber.
Figures 9A, 9B:
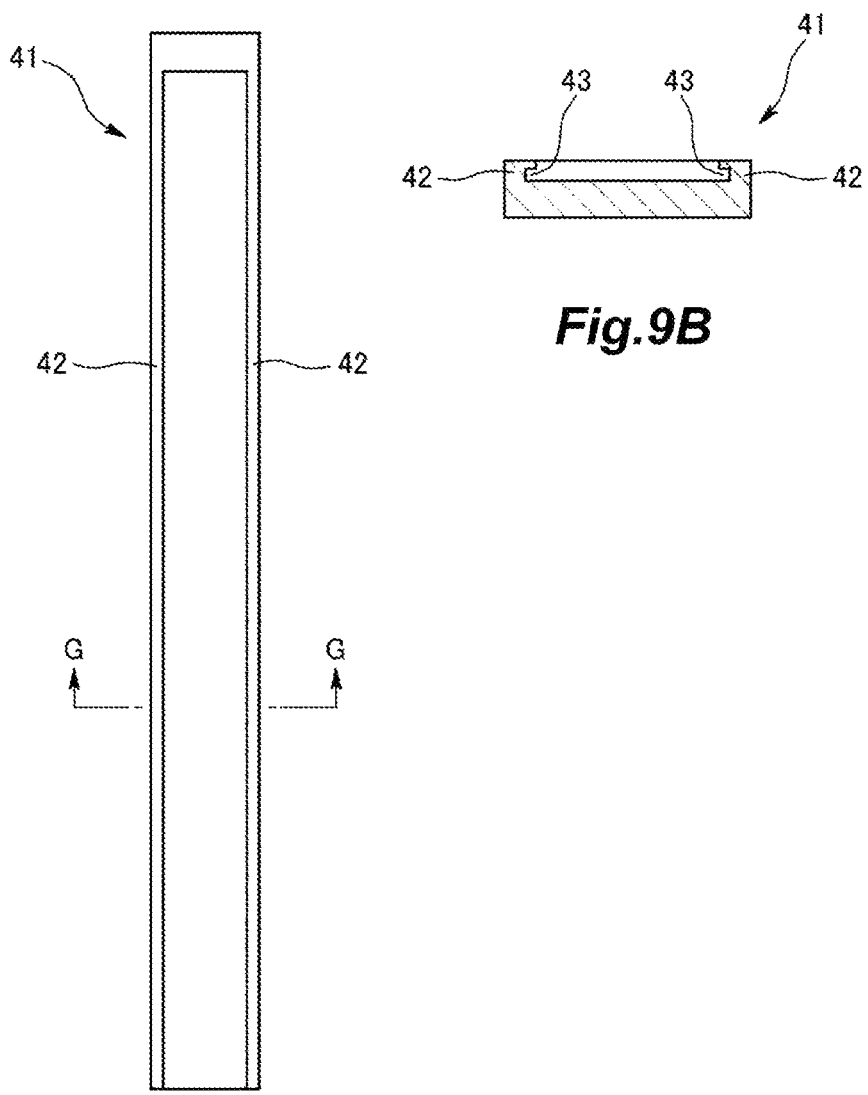
FIGS. 9A and 9B are diagrams showing a frame body used in the mounting structure.

In the example shown in FIGS. 8 and 9, the cushioning rubber 1 is inserted from one side of a frame body 41 in a longitudinal direction thereof, and the mounting margin protrusions 37 are inserted into mounting grooves 43 provided on an inner surface of side walls 42 of the frame body 41, thereby the cushioning rubber 1 is positioned. The mounting grooves 43 are provided at both end portions of the frame body 41 in a width direction thereof. Further, the mounting grooves 43 are respectively provided to be elongated in the longitudinal direction of the frame body 41.

Second Example

Figure 10:
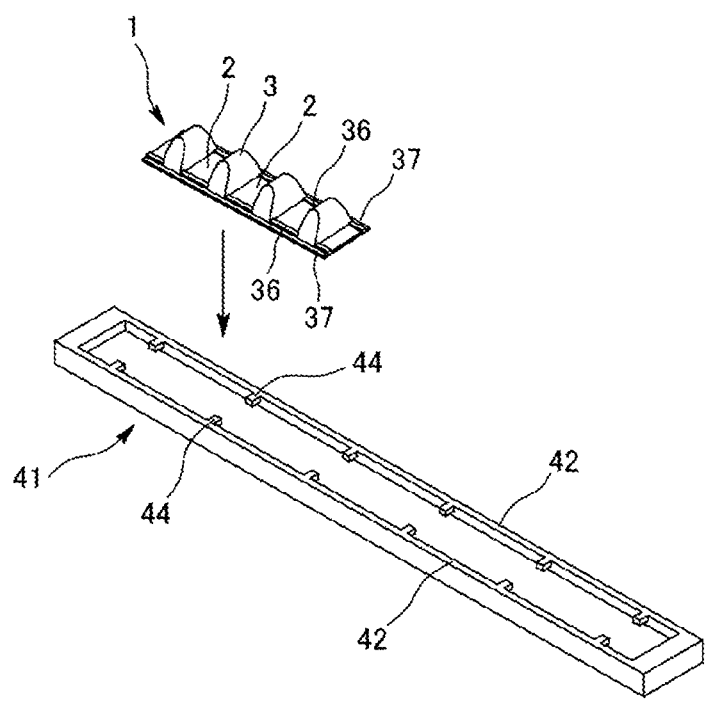
FIG. 10 is a perspective view showing a second example of the mounting structure for the cushioning rubber.
Figure 11:
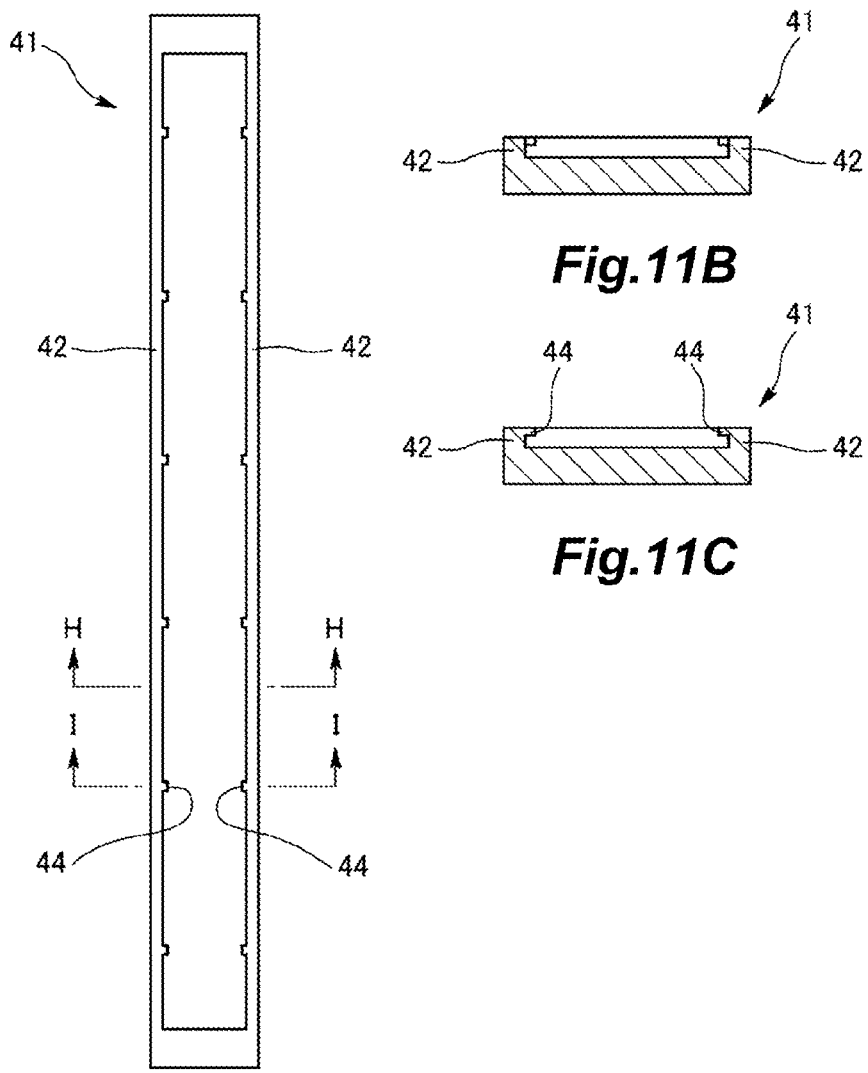
Figs. 11A, 11B, and 11C are diagrams showing a frame body used for the mounting structure.

In the example shown in FIGS. 10 and 11, the cushioning rubber 1 is press-fitted from above the frame body 41, and the mounting margin protrusions 37 are press-fitted and engaged with engagement protrusions 44 provided on the inner surfaces of the side walls 42 of the frame body 41, thereby the cushioning rubber 1 is positioned. The engagement protrusions 44 are provided at both end portions of the frame body 41 in the width direction. The engagement protrusions 44 are separately provided from each other at a plurality of positions (six positions in the figure) in the longitudinal direction of the frame body 41.

Other Examples

Figure 12:
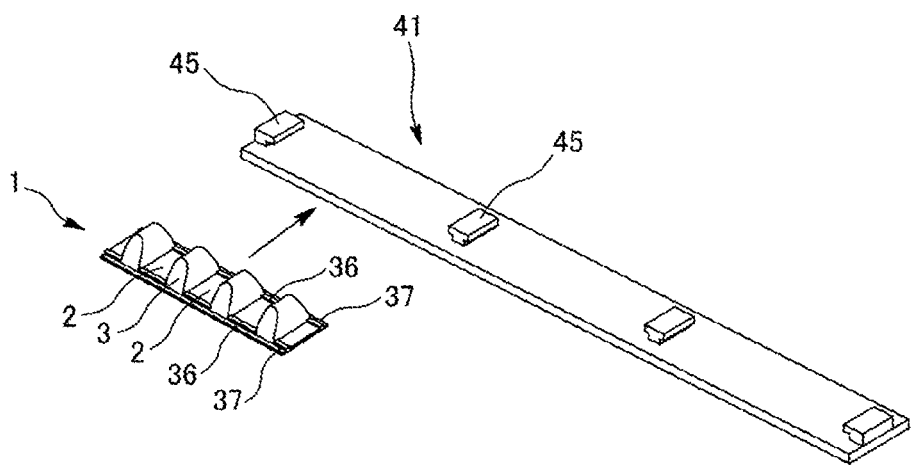
FIG. 12 is a perspective view showing a third example of the mounting structure for the cushioning rubber.
Figures 13A, 13B, 13C, 13D:
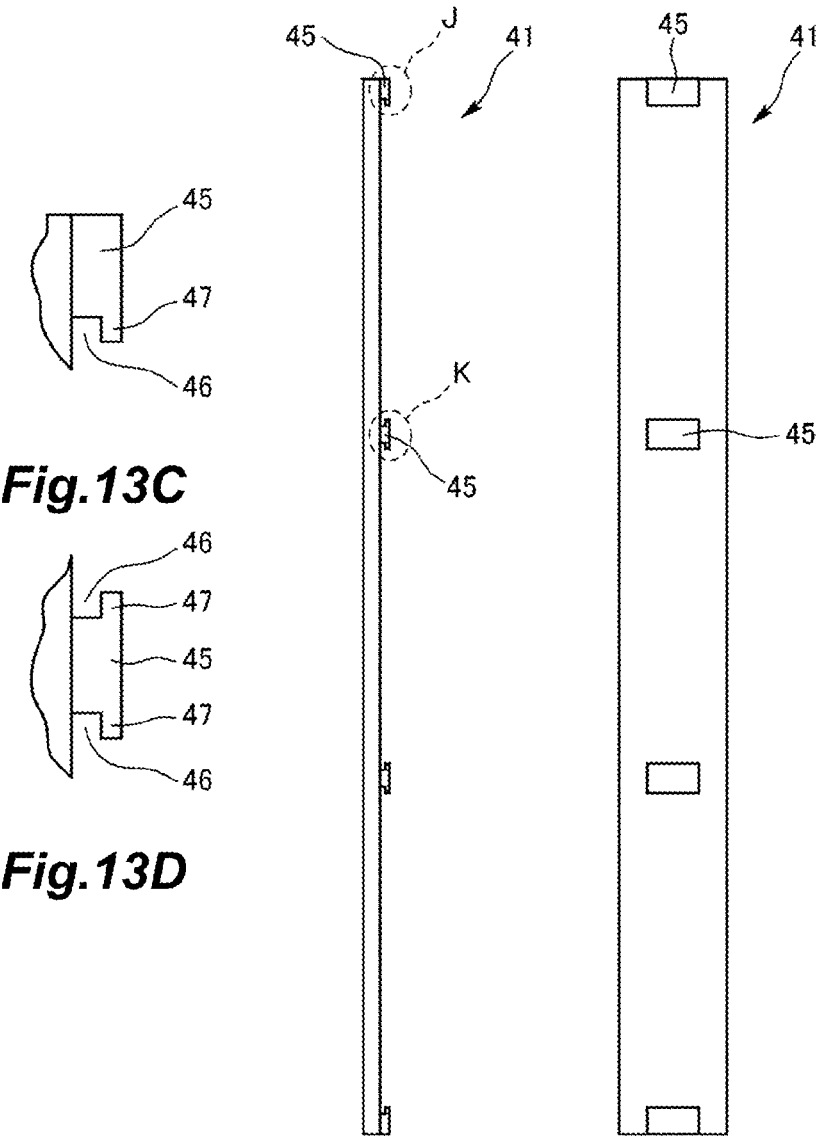
Figs. 13A, 13B, 13C, and 13D are diagrams showing a frame body used in the mounting structure.

In the example shown in FIGS. 12 and 13, the mounting margin protrusions 37 are not used. Instead, the cushioning rubber 1 may be press-fitted from one side of the frame body 41 in the width direction, and a pair of reinforcing ribs 36 in the width direction may sandwich an engagement protrusion 47 of an engagement portion 45 provided on a plane of the frame body 41 from both sides in the width direction, thereby the cushioning rubber 1 is positioned. The engagement portion 45 is provided on the plane and at a center of the plane of the frame body 41 in the width direction. The engagement portion 45 includes mounting grooves 46 that are configured to accommodate the end portions of the base portion 2 when the cushioning rubber 1 is mounted, and the engagement protrusions 47 that are configured to be sandwiched by the pair of reinforcing ribs 36 and that are provided above the mounting grooves 46.

The cushioning rubber 1 in first and second embodiments having the configurations described above is not formed as a flat and solid rubber as a whole, but is formed as a three-dimensional rubber film body having a bellows shape or a wavy shape. Therefore, when a load such as a weight or the like of a counterpart component (the item 52 to be loaded) acts on this three-dimensional film body, a reaction force is generated, but a magnitude of the generated reaction force is much smaller than a reaction force generated when a solid rubber is compressed. When a large load acts and the rubber is further compressed, the film body becomes bent further, and the reaction force is gradually increased. Thus, even if a large compression margin is set, the reaction force does not become extremely large, achieving a low reaction force characteristic.

The cushioning rubber 1 having the above configuration is suitable for filling gaps and coping with dimensional variation due to heat when a component having poor strength such as a sheet metal is used as the counterpart component.

In recent years, shifts to EV are remarkable in automobile industries, and an EV housing including batteries and piping tends to be larger in size, and on the other hand, it is difficult to secure a strength of the EV housing while suppressing an increase in weight. In view of this, the cushioning rubber 1 having the above configuration that achieves a low reaction force characteristic improves reliability and expands the possibility of device design.

The pair of side rising surfaces 35 in the second embodiment, which are provided as parts of the three-dimensional portion 3, are configured not of vertical planes but of inclined planes for the following reason.

If the side rising surface 35 is formed by a vertical plane, large reaction force may be generated when a load such as a weight of an item to be loaded acts on the cushioning rubber 1 from above. On the other hand, if the side rising surface 35 is formed by an inclined plane, the side rising surface 35 easily falls over toward the hollow portion 34 side, and reduced reaction force is generated.

Although the magnitude of the generated reaction force due to the side rising surface 35 can be thus reduced by forming them with an inclined plane, the reaction force does not become zero. Therefore, further reduced reaction force is generated by the cushioning rubber 1 according to the first embodiment in which the side rising surface 35 is not provided than the cushioning rubber 1 according to the second embodiment in which the side rising surface 35 is provided.

The magnitude of the reaction force generated in the cushioning rubber 1 can be adjusted by changing a three-dimensional shape of the side rising surface 35. For example, by selecting the shape of the side rising surface 35 from the following options, the magnitude of the reaction force generated in the cushioning rubber 1 can be adjusted.

(First Option)

Figure 14A:
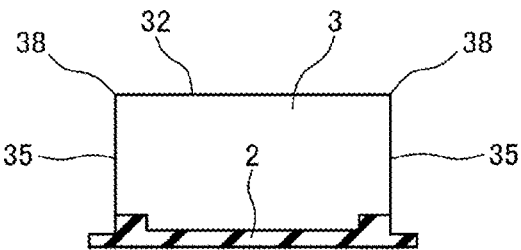
Figs. 14A, 14B, 14C, and 14D are explanatory diagrams (cross-sectional view) showing a reaction force adjusting method for the cushioning rubber.

In the example shown in FIG. 14A, the side rising surfaces 35 are formed to rise at a right angle with respect to the base portion 2, and right-angled corner portions 38 are provided between the side rising surfaces 35 and the top surface 32 ("vertical wall and right-angled corner type").

(Second Option)

Figure 14B:
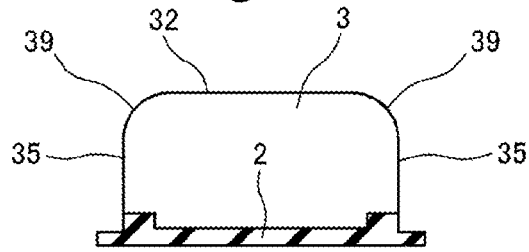

In the example shown in FIG. 14B, the side rising surfaces 35 are formed to rise at a right angle with respect to the base portion 2, and rounded portions 39 having arc-shaped cross-sections are formed between the side rising surfaces 35 and the top surface 32 ("vertical wall and rounded corner type").

(Third Option)

Figure 14C:
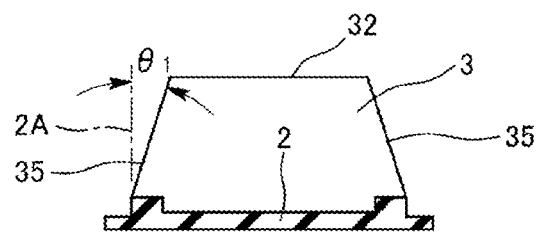

In the example shown in FIG. 14C, the side rising surfaces 35 are formed obliquely with respect to an imaginary plane 2A perpendicular to the base portion 2 to have a predetermined inclination angle $\theta_1$ ("small taper type").

(Fourth Option)

Figure 14D:
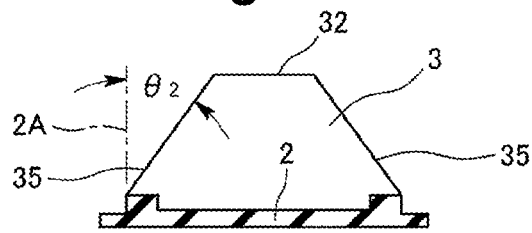

In the example shown in FIG. 14D, the side rising surfaces 35 are formed obliquely to have a predetermined inclination angle $\theta_2$ with respect to the imaginary plane 2A perpendicular to the base portion 2, and a magnitude of the inclination angle $\theta_2$ is set to be larger than the inclination angle $\theta_1$ in the third option ("large taper type").

Figure 15:
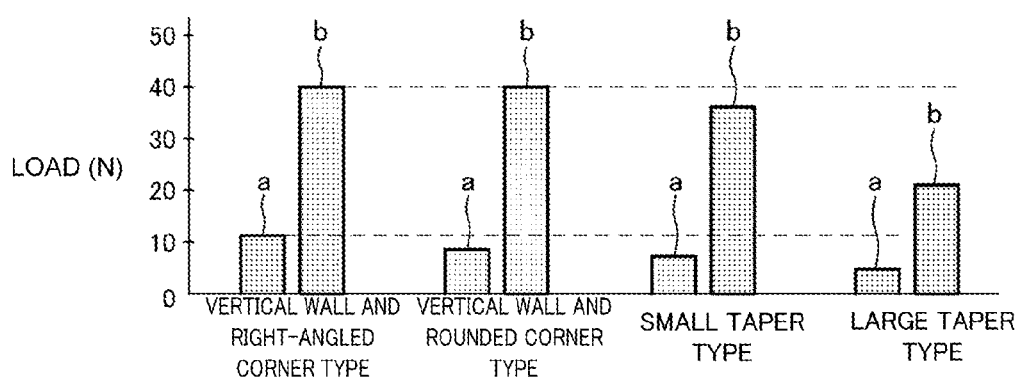
FIG. 15 is an explanatory diagram (a graph diagram) showing a reaction force adjusting method in the cushioning rubber.
Figure 16:
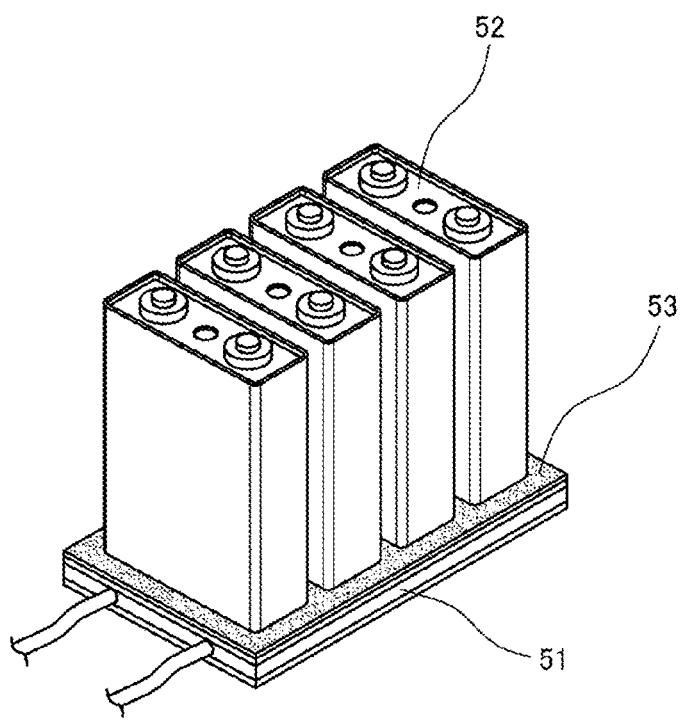
FIG. 16 is an explanatory diagram of the cushioning rubber described in the background art.

FIG. 15 shows magnitudes of the reaction forces generated in the cushioning rubber 1 according to the first to fourth options, where vertical plots "a" show magnitudes of the load for compressing the cushioning rubber 1 by 3.5 mm in height, and vertical plots "b" next to the plots "a" show magnitudes of the load for compressing the cushioning rubber 1 by 7.0 mm in height.

As shown in the graph of FIG. 15, by selecting and changing the shape of the side rising surface 35, the magnitude of the reaction force generated in the cushioning rubber 1 can be adjusted.

If it is desired to reduce the load and achieve a low reaction force only for a small compression amount (crushing amount), the second option (vertical wall and rounded corner type) is appropriate because the load is significantly lowered compared to the first option (vertical wall and right-angled corner type).

If it is desired to reduce the load and achieve a low reaction force for throughout large and small compression amounts (crushing amounts), the third option (small taper type) is appropriate because the load is significantly lowered compared to the first option (vertical wall and right-angled corner type) and the second option (vertical wall and rounded corner type), and the fourth option (large taper type) is more appropriate because the load is even lower than that of the third option (small taper type).

As a method of manufacturing the cushioning rubber 1, the cushioning rubber 1 according to the second embodiment provided with the side rising surfaces 35 can be molded with a rubber mold, and the cushioning rubber 1 according to the first embodiment can be manufactured by cutting out the side rising surfaces 35 of the cushioning rubber 1 according to the second embodiment with a knife, laser, water jet after demolding.

An item such as a secondary battery to be loaded on a vehicle body or the like may be loaded on, for example, a pedestal including a cushioning rubber in order to reduce an impact of vibration from the vehicle body or the like. The cushioning rubber functions to reduce the impact to the item by suppressing the vibration. In each of the embodiments described above, a flat plate portion (planar base portion) and a plurality of protruding portions (three-dimensional portion) protruding from the flat plate portion are provided, and the inside of each protruding portion is configured to be a cavity. When an item to be loaded is loaded on the cushioning rubber configured as above, the plurality of protruding portions are compressed to generate an appropriate repulsive force on the item, so that the above function can be exhibited.

Note that the cavity inside the protruding portion of the above configuration may be in a sealed state, and a pressure (an internal pressure) of gas contained in the cavity may increase. This may cause the repulsive force to vary from a desired magnitude or uneven repulsive force to be generated by each of the protruding portions.

In view of this, a cushioning rubber that can stabilize a repulsive force when an item to be loaded is loaded, and a pedestal including the cushioning rubber, will be described by the following examples.

Examples

Figure 17A:
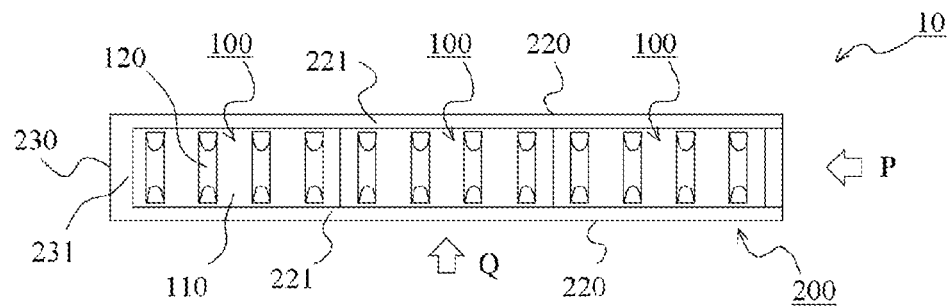
FIGS. 17A, 17B, 17C, and 17D are external views of a pedestal according to an embodiment of the present disclosure.
Figure 17B:
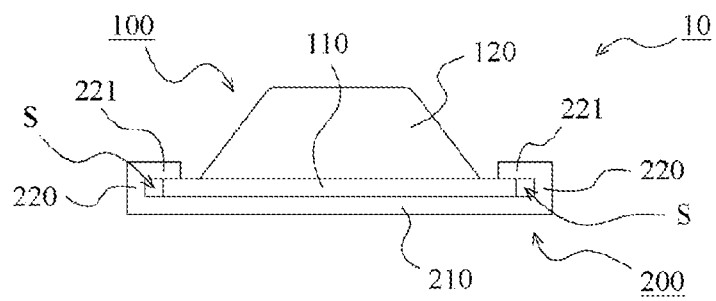
Figure 17C:
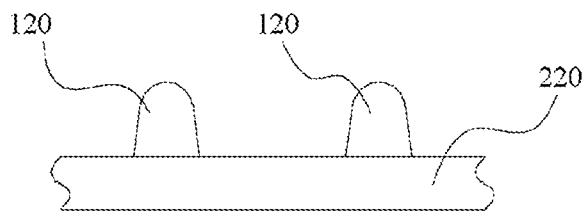
Figure 17D:
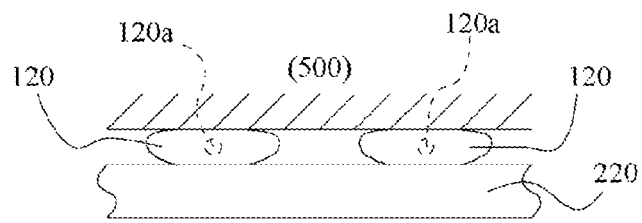
Figure 18A:
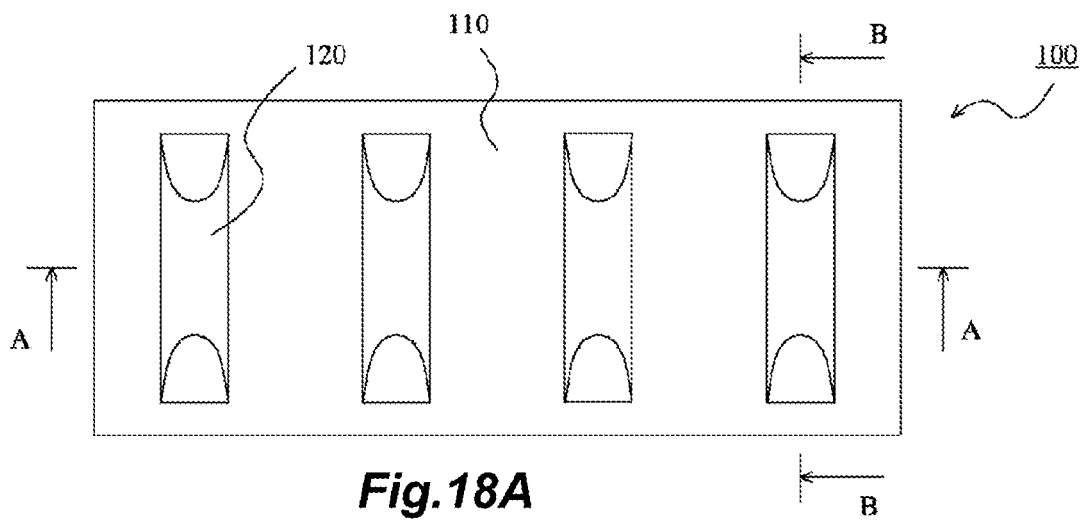
FIGS. 18A, 18B, 18C, and 18D are external views of a cushioning rubber according to an embodiment of the present disclosure.
Figure 18B:
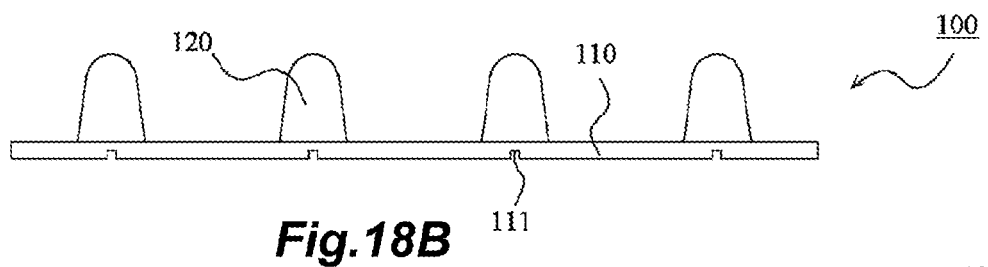
Figure 18C:
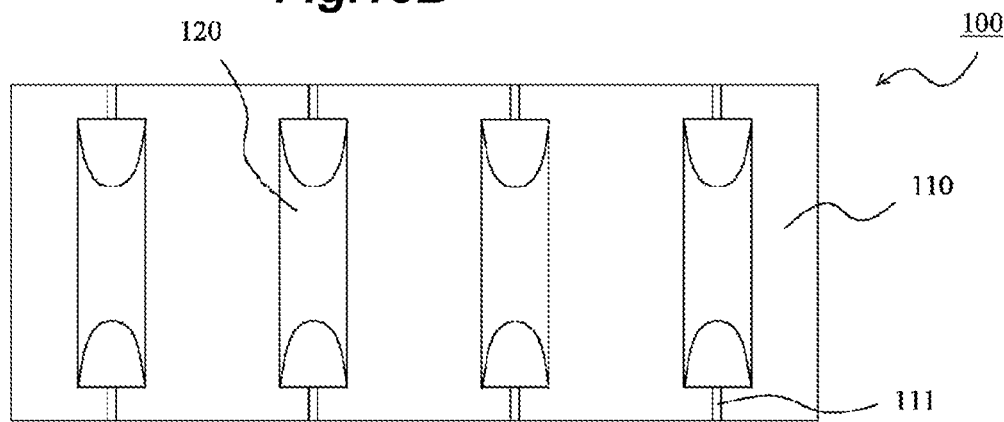
Figure 18D:
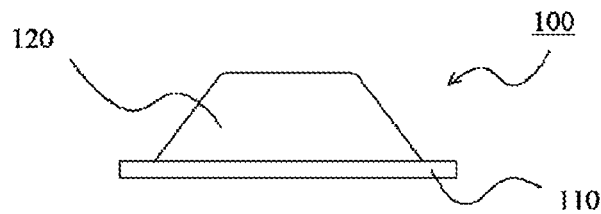
Figure 19A:
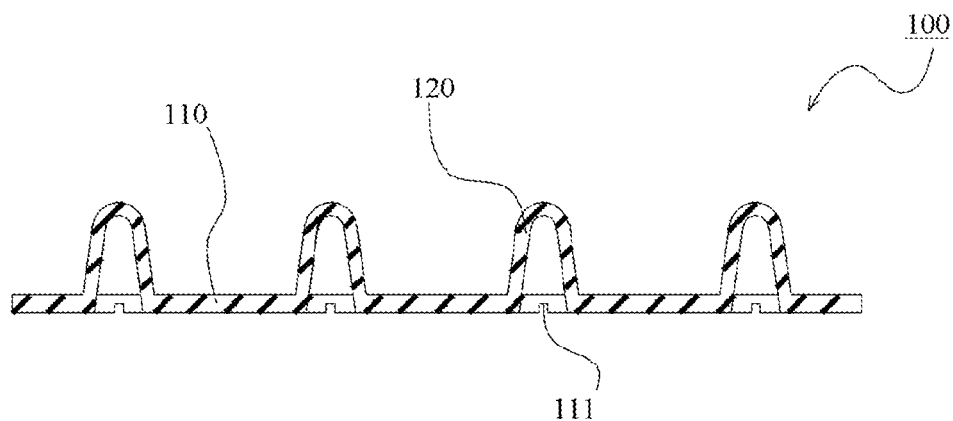
Figs. 19A and 19B are schematic cross-sectional views of a cushioning rubber according to an embodiment of the present disclosure.
Figure 19B:
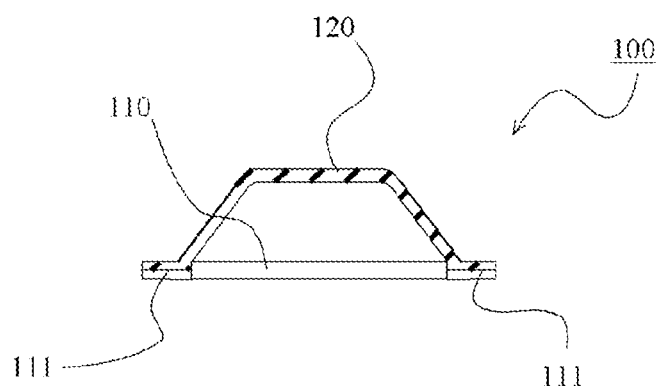

A cushioning rubber and a pedestal according to an embodiment of the present disclosure will be described with reference to FIGS. 17 to 19. FIG. 17 is an external view of the pedestal. FIG. 17A is a plan view of the pedestal, FIG. 17B is a side view of the pedestal (a view seen in the direction P in FIG. 17A), FIG. 17C is a part of a front view of the pedestal (a view seen in the direction Q in FIG. 17A), and FIG. 17D is a part of the front view of the pedestal in a state in which an item to be loaded is loaded. FIG. 18 is an external view of the cushioning rubber. FIG. 18A is a plan view of the cushioning rubber, FIG. 18B is a front view of the cushioning rubber, FIG. 18C is a reverse side view of the cushioning rubber, and FIG. 18D is a side view of the cushioning rubber. FIG. 19 is a schematic cross-sectional view of the cushioning rubber. FIG. 19A is a cross-sectional view along line A-A in FIG. 18A, and FIG. 19B is a cross-sectional view along line B-B in FIG. 18A.

<Pedestal>

An overall configuration of a pedestal 10 will be described. The pedestal 10 includes a cushioning rubber 100 made of a rubber material and a base plate 200 made of a material having rigidity such as resin or metal. The cushioning rubber 100 is disposed in a state in which it is positioned on the base plate 200. Three cushioning rubbers 100 are provided on one base plate 200. However, the number of cushioning rubbers provided on one base plate is not limited, and at least one cushioning rubber may be provided on one base plate.

The base plate 200 includes a bottom plate 210 having a rectangular planar shape, a pair of longer-side wall 220 provided along a pair of longer sides at both ends of the bottom plate 210 in a lateral direction thereof, and a shorter-side wall 230 provided along a shorter side at one end of the bottom plate 210 in a longitudinal direction thereof. Further, hooks 221 and 231 are provided at end portions of the longer-side walls 220 and the shorter-side wall 230 on sides opposite to the bottom plate 210 to extend along the longer-side walls 220 and the shorter-side wall 230.

By sliding the cushioning rubber 100 in the direction of arrow P in FIG. 17A with respect to the base plate 200 configured as described above, the cushioning rubber 100 can be disposed in the state in which it is positioned with respect to the base plate 200. More specifically, the cushioning rubber 100 is slid in a state in which vicinities of both lateral ends of a flat plate portion 110 of the cushioning rubber 100 are sandwiched between the bottom plate 210 and the pair of hooks 221 of the base plate 200, so that the cushioning rubber 100 can be attached to the base plate 200. Further, minute gaps S are formed between side surfaces of the flat plate portion 110 of the cushioning rubber 100 and inner wall surfaces of the pair of longer-side walls 220 of the base plate 200 (see FIG. 17B).

<Cushioning Rubber>

The cushioning rubber 100 includes a flat plate portion 110 and a plurality of protruding portions 120 that protrude from the flat plate portion 110. Each of peripheries of the plurality of protruding portions 120 is surrounded by a part of the flat plate portion 110 (see FIGS. 18A and 18C), and each of insides of the plurality of protruding portions 120 is configured to be a cavity. (See FIG. 19). When the cushioning rubber 100 configured as above is placed on a planar surface, the cavities inside the protruding portions 120 become sealed spaces. Thus, when the protruding portions 120 are compressed by loading an item 500 to be loaded, a pressure (an internal pressure) of gas in the sealed spaces may increase. FIG. 17D shows a state in which the base plate 200 is placed on a planar surface and the item 500 is loaded on the side of the cushioning rubber 100 where the plurality of protruding portions 120 are provided. Note that the pedestal 10 can be used even in a reverse state. That is, the pedestal 10 can also be used such that the plurality of protruding portions 120 of the cushioning rubber 100 are placed on the planar surface and the item 500 is loaded on the base plate 200. Even in this case, the cavities inside the protruding portions 120 become sealed spaces due to the item 500, and thus, the pressure (internal pressure) of the gas in the sealed spaces may increase when the protruding portions 120 are compressed.

In the pedestal 10, at least one of the base plate 200 and the cushioning rubber 100 is provided with an exhaust passage through which air inside each cavity of the plurality of protruding portions 120 can be exhausted to the outside. In the present embodiment, the cushioning rubber 100 is mainly provided with the exhaust passage.

In the cushioning rubber 100, a plurality of grooves 111 formed to extend from the cavity to the side surfaces of the flat plate portion 110 are provided on a surface of the flat plate portion 110 on a side opposite to a side on which the plurality of protruding portions 120 protrude (FIGS. 18B and 18C, and FIG. 19). The plurality of grooves 111 serve as exhaust passages. In the illustrated example, the grooves 111 are provided on both end sides of each of the protruding portions 120 in a longitudinal direction thereof.

<Advantages of Cushioning Rubber and Pedestal>

According to the cushioning rubber 100 and the pedestal 10, even when the protruding portions 120 are compressed by loading the item 500 (see FIG. 17D), the air in the cavities inside the protruding portions 120 are exhausted through the exhaust passages. More specifically, the air in the cavities is exhausted to the side surface sides of the flat plate portion 110 through the grooves 111, and further to the outside of the pedestal 10 through the gaps S. Thus, an increase in the internal pressure in the protruding portions 120 is suppressed, and repulsive forces of the protruding portions 120 against the item 500 do not undergo a change due to the pressure in the protruding portions 120. This stabilizes the repulsive forces of the protruding portions 120 against the item 500. Thus, the pedestal 10 having the cushioning rubber 100 can stably exhibit functions such as reducing an impact or the like.

In addition, if an adhesive tape is attached to a surface of the flat plate portion 110 of the cushioning rubber 100 on the side opposite to the side on which the plurality of protruding portions 120 protrude in order to fix the cushioning rubber 100 to the base plate 200, both ends of the grooves 111 (an end communicating with the cavity and an end on side surface side of the flat plate portion 110) are not closed. This enables the exhaust passages to be secured.

(Others)

In the above embodiment, the grooves 111 are provided in the flat plate portion 110 in order to provide the exhaust passages in the cushioning rubber 100. However, the configuration for providing the exhaust passages in the cushioning rubber 100 is not limited to the above embodiment. For example, as shown by dotted lines in FIG. 17D, through holes 120a may be provided in the protruding portions 120. Through the through holes 120a, the gas in the cavities can be exhausted directly to the outside of the pedestal 10 without providing the gaps S shown in FIG. 17B. As shown in the figure, the through holes 120a are to be provided at positions at which the through holes are not closed by the item 500. Note that the cushioning rubber 100 may have the grooves 111 only on the flat plate portion 110, the through holes 120a only in the protruding portions 120, or both the grooves 111 and the through holes 120a.

(Modified Example of Cushioning Rubber)

Figure 20A:
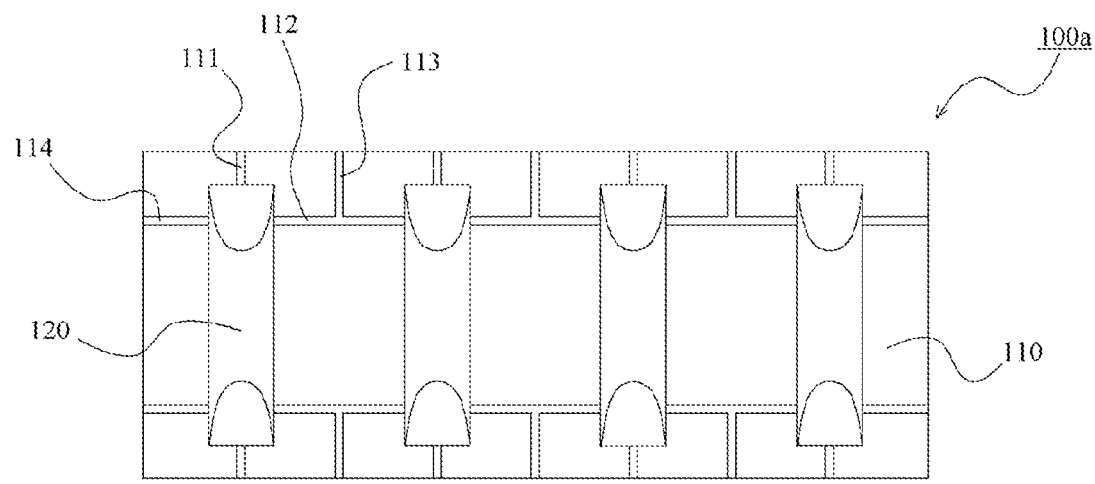
FIGS. 20A and 20B are external views of a cushioning rubber according to a modified embodiment of the present disclosure.
Figure 20B:
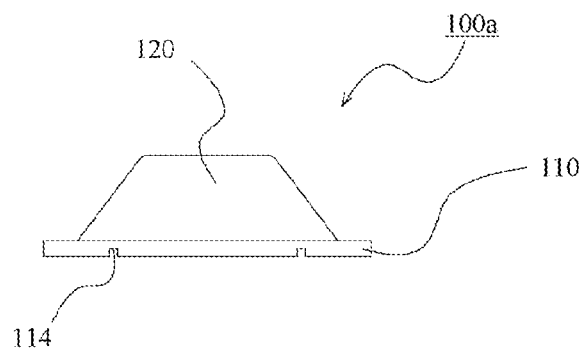

FIG. 20 shows a modified example of the cushioning rubber. Here, a modification of the grooves provided in the flat plate portion of the cushioning rubber shown in the above embodiment will be described. FIG. 20 is an external view of a cushioning rubber according to the modified example. FIG. 20A is a reverse side view of the cushioning rubber, and FIG. 20B is a side view of the cushioning rubber.

A cushioning rubber 100a according to the modified example includes the flat plate portion 110 and the plurality of protruding portions 120 that protrude from the flat plate portion 110, similarly to the cushioning rubber 100 shown in the above embodiment. The configurations of the flat plate portion 110 and the protruding portions 120 are the same as those described in the above embodiment, and thus descriptions thereof will be omitted. The grooves provided on the surface of the flat plate portion 110 on the side opposite to the side on which the plurality of protruding portions 120 protrude is different from those of the above embodiment.

In the present modified example, the grooves provided in the flat plate portion 110 includes a plurality of grooves 111 formed to extend from the cavity to the side surfaces of the flat plate portion 110, as in the above embodiment. In addition, a plurality of grooves 112 for connecting the cavities of the protruding portions 120 adjacent to each other, a plurality of grooves 113 formed to extend from the grooves 112 to the side surfaces of the flat plate portion 110, and a plurality of grooves 114 formed to extend from the cavity of the protruding portions 120 to side surfaces of the flat plate portion 110 on both end sides in a longitudinal direction thereof are provided.

The cushioning rubber 100a configured as described above achieves the same effect as that of the above embodiment. In addition, even if one of the grooves 111 of the cushioning rubber 100a is closed for some reason, the gas can be exhausted through the cavity of the other protruding portions 120. This enables more reliable gas exhaustion. Further, the grooves 114 secures the exhaust passages if the gaps S shown in FIG. 17 are not provided.

The through holes 120a shown in FIG. 17D may be provided in the cushioning rubber 100a.

(First Modified Example of Base Plate)

Figure 21A:
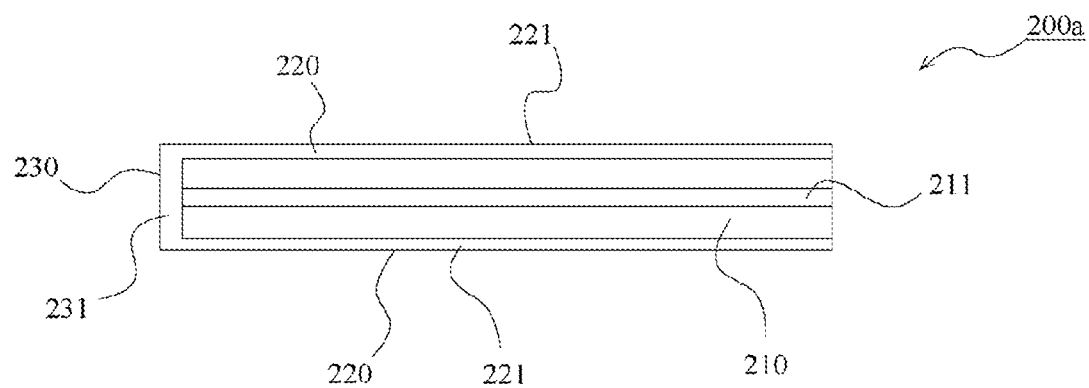
Figs. 21A and 21B are external views of a base plate according to a first modified embodiment of the present disclosure.
Figure 21B:
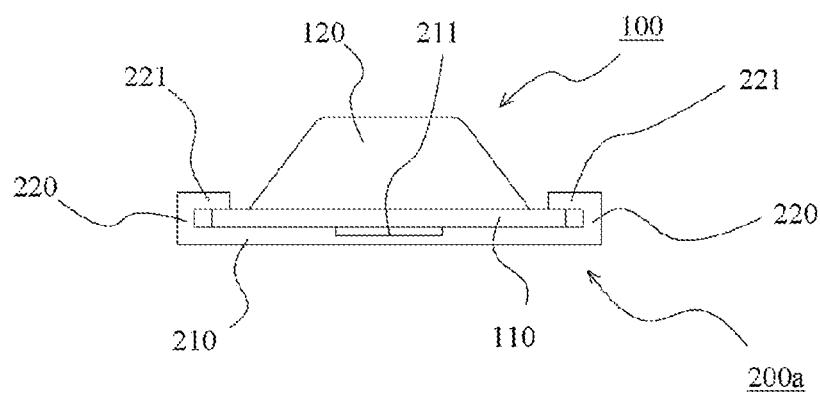

A first modified example of the base plate will be described with reference to FIG. 21. FIG. 21 is an external view of a base plate according to the first modified example of the present disclosure. FIG. 21A is a plan view of the base plate, and FIG. 21B is a side view showing a state in which the cushioning rubber 100 shown in the above embodiment is disposed on the base plate.

A base plate 200a according to the first modified example includes the bottom plate 210, the pair of longer-side walls 220 each provided with the hook 221, and the shorter-side wall 230 provided with the hook 231. Since these are the same as those of the base plate 200 described in the above embodiment, descriptions thereof will be omitted. In addition, in the base plate 200a, a groove 211 is provided on a surface of the bottom plate 210. The groove 211 of the base plate 200a functions as the exhaust passage through which the air inside the cavities of the plurality of protruding portions 120 can be exhausted to the outside.

The base plate 200a can secure the exhaust passage without providing the grooves 111 or the through holes 120a in the cushioning rubber 100. Note that the grooves 111 and the through holes 120a may be provided in addition. Further, the cushioning rubber 100a according to the above modified example may be attached to the base plate 200a.

(Second Modified Example of Base Plate)

Figure 22A:
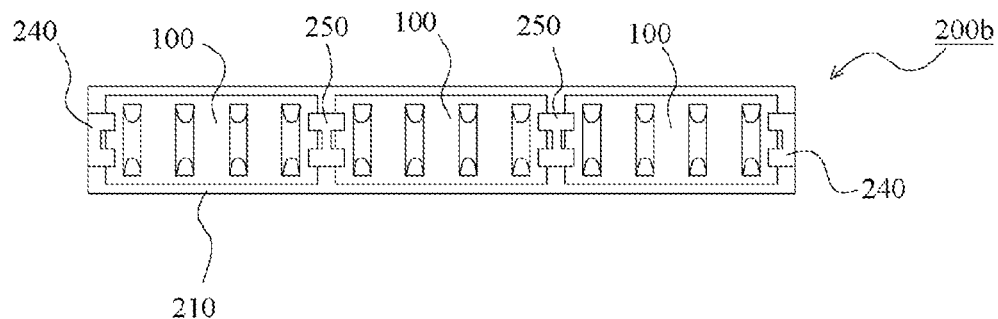
Figs. 22A, 22B, and 22C are diagrams showing a base plate according to a second modified embodiment of the present disclosure.
Figure 22B:
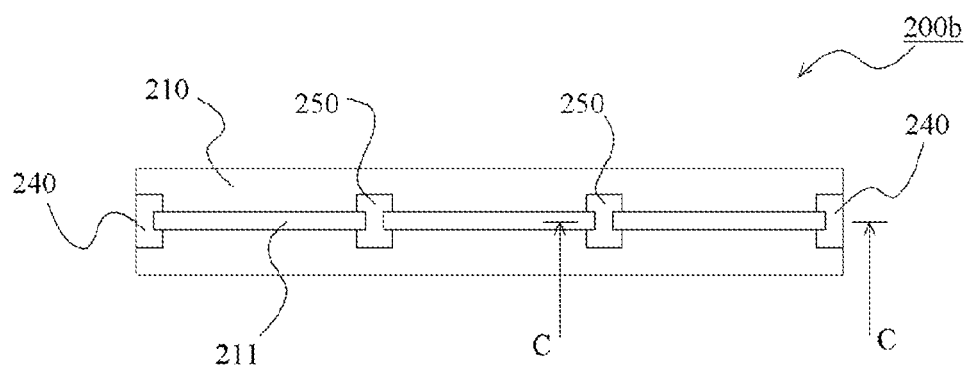
Figure 22C:
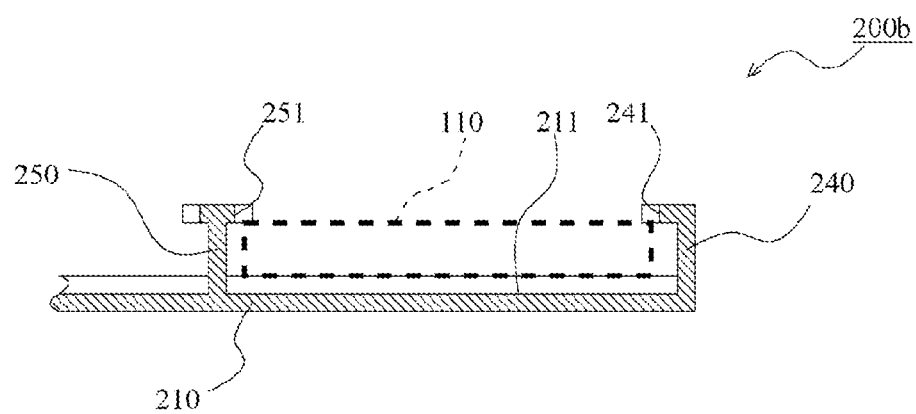

A second modified example of the base plate will be described with reference to FIG. 22. FIG. 22 is a diagram showing a base plate according to the second modified example of the present disclosure. FIG. 22A is a plan view showing a state in which the cushioning rubber 100 shown in the above embodiment is disposed on the base plate, FIG. 22B is a plan view of the base plate, and FIG. 22C is a schematic cross-sectional view along C-C in FIG. 22B of the base plate.

A base plate 200b according to the second modified example includes the bottom plate 210 having a rectangular planar shape, a pair of end hooks 240 provided at both ends of the bottom plate 210 in the longitudinal direction, and a pair of central hooks 250 provided at trisecting points of the bottom plate 210 in the longitudinal direction. The cushioning rubber 100 can be attached to the base plate 200b by sliding the cushioning rubber 100 from the upper side to the lower side of the paper surface, or from the lower side to the upper side in FIGS. 22A and 22B, which is a different manner from the above described base plates 200 and 200a. Both ends of the cushioning rubber 100 in the longitudinal direction are sandwiched between the bottom plate 210 and either the end hooks 240 or the central hooks 250, and thus the cushioning rubber 100 is attached to the base plate 200b in a positioned state. A dotted line in FIG. 22C shows a position of the flat plate portion 110 when the cushioning rubber 100 is attached.

The base plate 200b can achieve the same effect as that of the above embodiment. In addition, as shown in FIG. 22, the base plate 200b may have the groove 211 provided on the surface of the bottom plate 210 and notches 241 and 251 provided on the pair of end hooks 240 and the pair of central hooks 250. This forms the exhaust passage by the groove 211 and the notches 241 and 251. Thus, as in the base plate 200a according to the first modified example, the exhaust passage can be secured even if the cushioning rubber 100 is not provided with the grooves 111 or the through holes 120a. Note that the grooves 111 and the through holes 120a may be provided in addition. Further, the cushioning rubber 100a according to the above modified example may be attached to the base plate 200b.

(Third Modified Example of Base Plate)

Figure 23A:
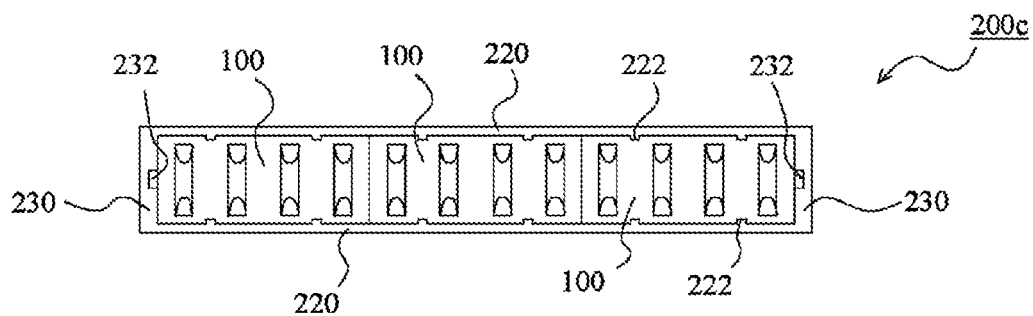
Figs. 23A, 23B, 23C, and 23D are diagrams showing a base plate according to a third modified embodiment of the present disclosure.
Figure 23B:
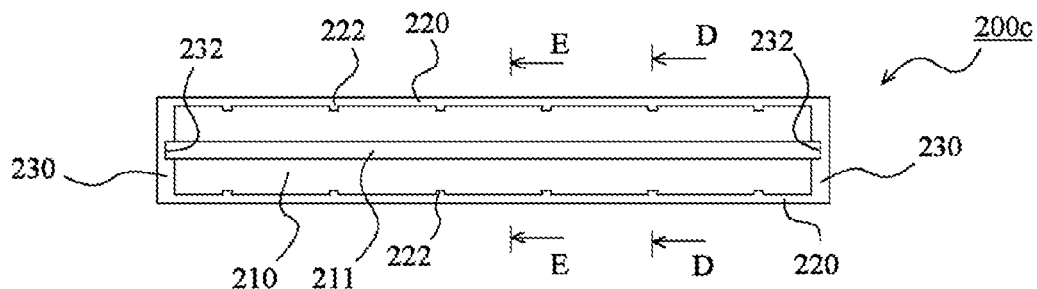
Figure 23C:
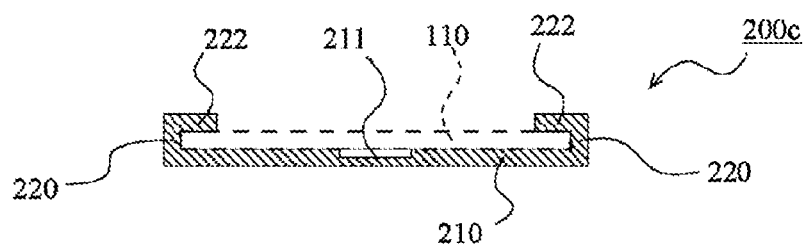
Figure 23D:
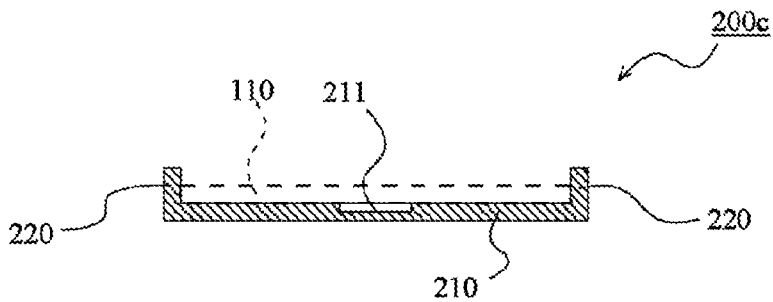

A third modified example of the base plate will be described with reference to FIG. 23. FIG. 23 is a diagram showing a base plate according to the third modified example of the present disclosure. FIG. 23A is a plan view showing a state in which the cushioning rubber 100 shown in the above embodiment is disposed on the base plate, FIG. 23B is a top view of the base plate, FIG. 23C is a schematic cross-sectional view of the base plate along D-D in FIG. 23B, and FIG. 23D is a schematic cross-sectional view of the base plate along E-E in FIG. 23B. Dotted lines in FIGS. 23C and 23D show a position of the flat plate portion 110 in a state in which the cushioning rubber 100 is disposed.

A base plate 200c according to the third modified example includes the bottom plate 210 having a rectangular planar shape, the pair of longer-side walls 220 provided along the pair of longer sides at both ends of the bottom plate 210 in the lateral direction, and the pair of shorter-side walls 230 respectively provided along the shorter sides at both ends of the bottom plate 210 in the longitudinal direction. The base plate 200c has a plurality of hooks 222 provided at intervals in end portions of the longer-side walls 220 on a side opposite to the bottom plate 210, which is a different configuration from the base plate 200 according to the above embodiment.

The cushioning rubber 100 can be attached to the base plate 200c by fitting the cushioning rubber 100 from the front side into the back side of the paper surface in FIGS. 23A and 23B, which is a different manner from the bases 200 and 200a. Both ends of the cushioning rubber 100 in the lateral direction are sandwiched by the plurality of hooks 222 and the bottom plate 210, and thus the cushioning rubber 100 is attached to the base plate 200c in a positioned state.

Further, the base plate 200c has grooves 211 and 232 provided on the surface of the bottom plate 210 and the inner wall surfaces of the pair of shorter-side walls 230. An exhaust passage is formed by the grooves 211 and 232. This secures the exhaust passage even when the cushioning rubber 100 is not provide with the grooves 111 or the through holes 120a, as in the base plate 200a according to the first modified example. Note that the grooves 111 and the through holes 120a may be provided in addition. Further, the cushioning rubber 100a according to the above modified example may be attached to the base plate 200c.

REFERENCE SIGNS LIST

1 Cushioning rubber
2 Base portion
3 Three-dimensional portion
31, 33 Rising surface
32 Top surface
34 Hollow portion
35 Side rising surface
36 Reinforcing rib
37 Mounting margin protrusion
38 Corner portion
39 Rounded portion
41 Frame body
42 Side wall
43, 46 Mounting groove
44, 47 Engagement protrusion
45 Engagement portion
51 Base
52 Item to be loaded
10 Pedestal
100,100a Cushioning rubber
110 Flat plate portion
111, 112, 113, 114 Groove
120 Protruding portion
120a Through hole
200, 200a, 200b, 200c Base plate
210 Bottom plate
211 Groove
220 Longer-side wall
221, 222 Hook
230 Shorter-side wall
231 Hook
232 Groove
240 End hook
241 Notch
250 Central hook
251 Notch
500 Item to be loaded

The invention claimed is:

1. A sheet-shaped cushioning rubber, comprising: a base portion that is planar and a three-dimensional portion formed to rise from the base portion toward one side in a sheet thickness direction, the base portion and the three-dimensional portion being alternately provided in one direction of a sheet plane, wherein: the three-dimensional portion includes a hollow portion that opens toward another side in the sheet thickness direction such that an opening region of the hollow portion is defined at a bottom surface of the base portion, and wherein the base portion does not cover the opening region, the three-dimensional portion is integrally provided with a first rising surface that is continuous from the base portion, a top surface, a second rising surface on a side opposite to the first rising surface, and a pair of side rising surfaces on both sides in a sheet width direction, wherein, above the base portion, the first rising surface, the top surface, the second rising surface, and pair of side rising surfaces form a continuously closed surface of three-dimensional portion, and the hollow portion opens only toward the otherside in the sheet thickness direction, and a reinforcing rib that is connected to the three-dimensional portion and inhibits falling over of the three-dimensional portion is integrally provided on a plane of the base portion.

2. A method of adjusting a magnitude of a reaction force generated in the cushioning rubber according to claim 1, the method comprising:
adjusting the magnitude of the reaction force generated in the cushioning rubber by selecting, at a time the cushioning rubber is manufactured, any of:
forming each of the side rising surfaces at a right angle with respect to the base portion and providing a right-angled corner between each of the side rising surfaces and the top surface;
forming each of the side rising surfaces at a right angle with respect to the base portion and providing a rounded portion having an arc-shaped cross-section between each of the side rising surfaces and the top surface; and
forming each of the side rising surfaces obliquely with a predetermined inclination angle with respect to an imaginary plane perpendicular to the base portion.

3. A sheet-shaped cushioning rubber, comprising: a base portion that is planar and a three-dimensional portion formed to rise from the base portion toward one side in a sheet thickness direction, the base portion and the three-dimensional portion being alternately provided in one direction of a sheet plane, wherein: the three-dimensional portion includes a hollow portion that opens toward another side in the sheet thickness direction such that an opening region of the hollow portion is defined at a bottom surface of the base portion, and wherein the base portion does not cover the opening region, the three-dimensional portion is integrally provided with a first rising surface that is continuous from the base portion, a top surface, a second rising surface on a side opposite to the first rising surface, and a pair of side rising surfaces on both sides in a sheet width direction, wherein, above the base portion, the first rising surface, the top surface, the second rising surface, and pair of side rising surfaces form a continuously closed surface of three-dimensional portion, and the hollow portion opens only toward the other side in the sheet thickness direction, and a protrusion used as a mounting margin for the cushioning rubber is integrally provided to protrude in the width direction from an end portion of the cushioning rubber in the width direction.

4. A method of adjusting a magnitude of a reaction force generated in the cushioning rubber according to claim 3, the method comprising:
adjusting the magnitude of the reaction force generated in the cushioning rubber by selecting, at a time the cushioning rubber is manufactured, any of:
forming each of the side rising surfaces at a right angle with respect to the base portion and providing a right-angled corner between each of the side rising surfaces and the top surface;
forming each of the side rising surfaces at a right angle with respect to the base portion and providing a rounded portion having an arc-shaped cross-section between each of the side rising surfaces and the top surface; and
forming each of the side rising surfaces obliquely with a predetermined inclination angle with respect to an imaginary plane perpendicular to the base portion.

* * * * *